US012810703B2

(12) United States Patent
Cho et al.

(10) Patent No.: US 12,810,703 B2
(45) Date of Patent: Nov. 24, 2026

(54) SHORTEST EVACUATION ROUTE SYSTEM AND OPERATION METHOD USING THE SAME

(71) Applicant: RozeAI Korea Co., Ltd., Seongnam-si (KR)

(72) Inventors: Young-Jin Cho, Seongnam-si (KR); Chang-Sik Jung, Seoul (KR)

(73) Assignee: RozeAI Korea Co., Ltd., Seongnam-si (KR)

( * ) Notice: Subject to any disclaimer, the term of this patent is extended or adjusted under 35 U.S.C. 154(b) by 0 days.

(21) Appl. No.: 19/221,879

(22) Filed: May 29, 2025

(65) Prior Publication Data

US 2025/0371949 A1 Dec. 4, 2025

(30) Foreign Application Priority Data

May 30, 2024 (KR) ........................ 10-2024-0070802

(51) Int. Cl.
*G08B 21/02* (2006.01)
*G08B 5/36* (2006.01)
(Continued)

(52) U.S. Cl.
CPC ............... *G08B 7/066* (2013.01); *G08B 5/36* (2013.01); *G08B 17/00* (2013.01); *G08B 21/02* (2013.01); *G08B 25/009* (2013.01); *G08B 25/10* (2013.01)

(58) Field of Classification Search
CPC ........ G08B 7/066; G08B 17/10; G08B 17/00; G08B 17/06; G08B 25/14; G08B 25/10; G08B 5/22; G08B 17/12; G08B 3/10; G08B 5/38; G08B 7/062; G08B 17/125; G08B 21/12; G08B 21/182; G08B 25/08; G08B 25/12; G08B 26/003; G08B 27/008; G08B 5/223; G08B 1/00; G08B 3/00; G08B 5/00; G08B 6/00; G08B 7/00; G08B 9/00;
(Continued)

(56) References Cited

U.S. PATENT DOCUMENTS 9,898,912 B1 * 2/2018 Jordan .................. G01C 21/20
2011/0148661 A1 * 6/2011 Shikii ....................... E01F 9/20
315/307

(Continued)

FOREIGN PATENT DOCUMENTS

KR 101539510 B1 7/2015
KR 102077801 B1 2/2020
KR 20230132096 A 9/2023

OTHER PUBLICATIONS

Moon, J.H., et al., "Comparison of Optimal Path Algorithms and Implementation of Block Transporter Planning System", Journal of the Society of Naval Architects of Korea, 53(2): 115-126 (2016).

*Primary Examiner* — Daniel Previl
(74) *Attorney, Agent, or Firm* — HoustonHogle LLP

(57) ABSTRACT

A shortest evacuation route system is disclosed. The shortest evacuation route system comprises a plurality of sensing units, each including an evacuation guide light, configured to output and transmit a fire detection signal which is a signal generated by detecting an occurrence of a fire or an amplified signal of a received signal, and a shortest evacuation route generation server. The shortest evacuation route generation server comprises a graph generation unit, a shortest path generation unit, and a network interconnection unit.

15 Claims, 7 Drawing Sheets

(51) Int. Cl.
*G08B 7/06* (2006.01)
*G08B 17/00* (2006.01)
*G08B 25/00* (2006.01)
*G08B 25/10* (2006.01)

(58) Field of Classification Search
CPC ........ G08B 13/00; G08B 15/00; G08B 19/00; G08B 21/00; G08B 23/00; G08B 25/00; G08B 26/00; G08B 27/00; G08B 29/00; G08B 31/00; G06Q 50/26; G06Q 50/10; G06Q 10/00; G06Q 20/00; G06Q 30/00; G09F 2019/225; G09F 19/22; A62B 7/02; A62C 2/24; A62C 3/0207; A62C 2/00; A62C 3/00; A62C 4/00; A62C 5/00; A62C 8/00; A62C 11/00; A62C 13/00; A62C 15/00; A62C 17/00; A62C 19/00; A62C 25/00; A62C 27/00; A62C 29/00; A62C 31/00; A62C 33/00; F24F 2007/001; F24F 2009/002; G01D 21/02; G01N 33/0063; G01N 1/00; G01N 3/00; G01N 5/00; G01N 7/00; G01N 9/00; G01S 2205/02; G01S 1/00; G01S 3/00; G01S 5/00; G01S 7/00; G01S 11/00; G01S 13/00; G01S 15/00; G06M 15/00; G06M 1/00; G06M 3/00; G06M 7/00; H02S 10/00; H02S 20/00; H02S 30/00; H02S 40/00; H04H 20/59; H04H 20/00; H04H 40/00; H04H 60/00; H04N 7/181; H04N 1/00; H04N 3/00; H04N 5/00; H04N 7/00; H04N 9/00; H04N 11/00; H04W 4/80; H04W 4/90; H04W 4/00; H04W 8/00; H04W 12/00; H04W 16/00; H04W 24/00; H04W 28/00; H04W 36/00; H04W 40/00; H04W 48/00; H04W 52/00; H04W 56/00; H04W 60/00; H04W 64/00; H04W 68/00; H04W 72/00; H04W 74/00; H04W 76/00; H04W 80/00; H04W 84/00; H04W 88/00; H04W 92/00; H04W 99/00; Y02E 10/00; Y02E 20/00; Y02E 30/00; Y02E 40/00; Y02E 50/00; Y02E 60/00; Y02E 70/00
USPC .... 340/573.1, 435, 545.3, 588, 628, 539.13, 340/539.2, 539.22, 641, 679, 691.6, 340/825.23
See application file for complete search history.

(56) References Cited

U.S. PATENT DOCUMENTS

2021/0201634 A1* 7/2021 Liu ........................ G08B 17/10
2023/0009081 A1* 1/2023 Paripally ................ G06V 40/10

* cited by examiner

SHORTEST EVACUATION ROUTE SYSTEM AND OPERATION METHOD USING THE SAME

CROSS-REFERENCE TO RELATED APPLICATIONS

This application claims priority under 35 U.S.C. § 119 to Korean Patent Applications No. 10-2024-0070802 filed on May 30, 2024 in the Korean Intellectual Property Office, the disclosures of which are incorporated by reference herein in their entireties.

BACKGROUND

The present disclosure relates to a shortest evacuation route system and its operation method with improved reliability.

In general, fires cause not only loss of life but also significant economic damage. Once a fire occurs, recovery takes a long time and significant costs.

Even in places equipped with fire prevention systems, a small lapse in attention may quickly lead to a large fire, causing considerable damage.

Therefore, preventing fires is crucial, but in cases where a fire occurs, it is important to detect the fire as quickly as possible, evacuate swiftly, and suppress the fire to minimize both human and economic losses.

SUMMARY

The present disclosure aims to provide a shortest evacuation route system and its operation method with enhanced reliability.

A shortest evacuation route system comprises, a plurality of sensing units, each including an evacuation guide light, configured to output and transmit a fire detection signal which is a signal generated by detecting an occurrence of a fire or an amplified signal of a received signal; and a shortest evacuation route generation server. The shortest evacuation route generation server comprises: a graph generation unit configured to define positions of a plurality of sensing units as a plurality of vertices and generate a first graph having the plurality of vertices and edges connecting the plurality of vertices; a shortest path generation unit configured to generate shortest evacuation route information between a start vertex and a destination vertex among the plurality of vertices; and a network interconnection unit configured to receive the fire detection signal and transmit the shortest evacuation route information to the plurality of sensing units. The graph generation unit generates a second graph by deleting an edge leading to a vertex corresponding to a sensing unit, among the plurality of sensing units, that generates the fire detection signal from the first graph. The shortest path generation unit generates the shortest evacuation route information based on the second graph.

For example, the shortest path generation unit stores a plurality of selected vertices, among the plurality of vertices in the second graph, where a number of connected edges is above average, which include a sub-start vertex and a sub-destination vertex, and the shortest path generation unit generates a sub-shortest path between the sub-start vertex and the sub-destination vertex using a first algorithm.

For example, wherein, when the start vertex matches the sub-start vertex and the destination vertex matches the sub-destination vertex, the shortest path generation unit generates the shortest evacuation route information based on the sub-shortest path.

For example, when the start vertex does not match the sub-start vertex, the shortest path generation unit is configured to: generate a first partial shortest path between the start vertex and the sub-start vertex using a second algorithm different from the first algorithm, and generate the shortest evacuation route information based on the first partial shortest path and the sub-shortest path.

For example, the first algorithm is Dijkstra algorithm, and the second algorithm is A* algorithm.

For example, when the destination vertex does not match the sub-destination vertex, the shortest path generation unit is configured to: generate a second partial shortest path between the destination vertex and the sub-destination vertex using the second algorithm, and generate the shortest evacuation route information based on the second partial shortest path and the sub-shortest path.

For example, the start vertex corresponds to a vertex of a sensing unit, among the plurality of sensing units, that receives the shortest evacuation route information, and the destination vertex corresponds to a vertex of a sensing unit, among the plurality of sensing units, that is adjacent to an area where an emergency exit is located.

For example, the shortest evacuation route generation server further includes a guide light information generation unit configured to generate guide light information for controlling lighting of the evacuation guide light based on the shortest evacuation route information, and the network interconnection unit transmits the guide light information to the plurality of sensing units.

For example, each of the plurality of sensing units light the evacuation guide light in a direction corresponding to the shortest evacuation route information based on the guide light information.

For example, each of the plurality of sensing units generate the fire detection signal when a detected value is measured to be equal to or above a threshold.

A method for generating the shortest evacuation route, comprises: defining positions of a plurality of sensing units as a plurality of vertices and generating a first graph having the plurality of vertices and edges connecting the plurality of vertices; receiving a fire detection signal from the plurality of sensing units; and generating shortest evacuation route information between a start vertex and a destination vertex among the plurality of vertices. Generating the shortest path information includes: generating a second graph by deleting an edge leading to a vertex corresponding to a sensing unit, among the plurality of sensing units, that generates the fire detection signal from the first graph; storing a plurality of selected vertices, among the plurality of vertices in the second graph, where a number of connected edges is above average, which include a sub-start vertex and a sub-destination vertex; and generating a sub-shortest path between the sub-start vertex and the sub-destination vertex using Dijkstra algorithm.

For example, when the start vertex matches the sub-start vertex and the destination vertex matches the sub-destination vertex, generating the shortest evacuation route information further includes generating the shortest evacuation route information based on the sub-shortest path.

For example, when the start vertex does not match the sub-start vertex, generating the shortest evacuation route information further includes generating a first partial shortest path between the start vertex and the sub-start vertex using A* algorithm, and generating the shortest evacuation route information based on the first partial shortest path and the sub-shortest path.

For example, when the destination vertex does not match the sub-destination vertex, generating the shortest evacuation route information further includes generating a second partial shortest path between the destination vertex and the sub-destination vertex using A* algorithm, and generating the shortest evacuation route information based on the second partial shortest path and the sub-shortest path.

For example, the start vertex corresponds to a vertex of a sensing unit, among the plurality of sensing units, that receives the shortest evacuation route information, and the destination vertex corresponds to a vertex of a sensing unit, among the plurality of sensing units, that is adjacent to an area where an emergency exit is located.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
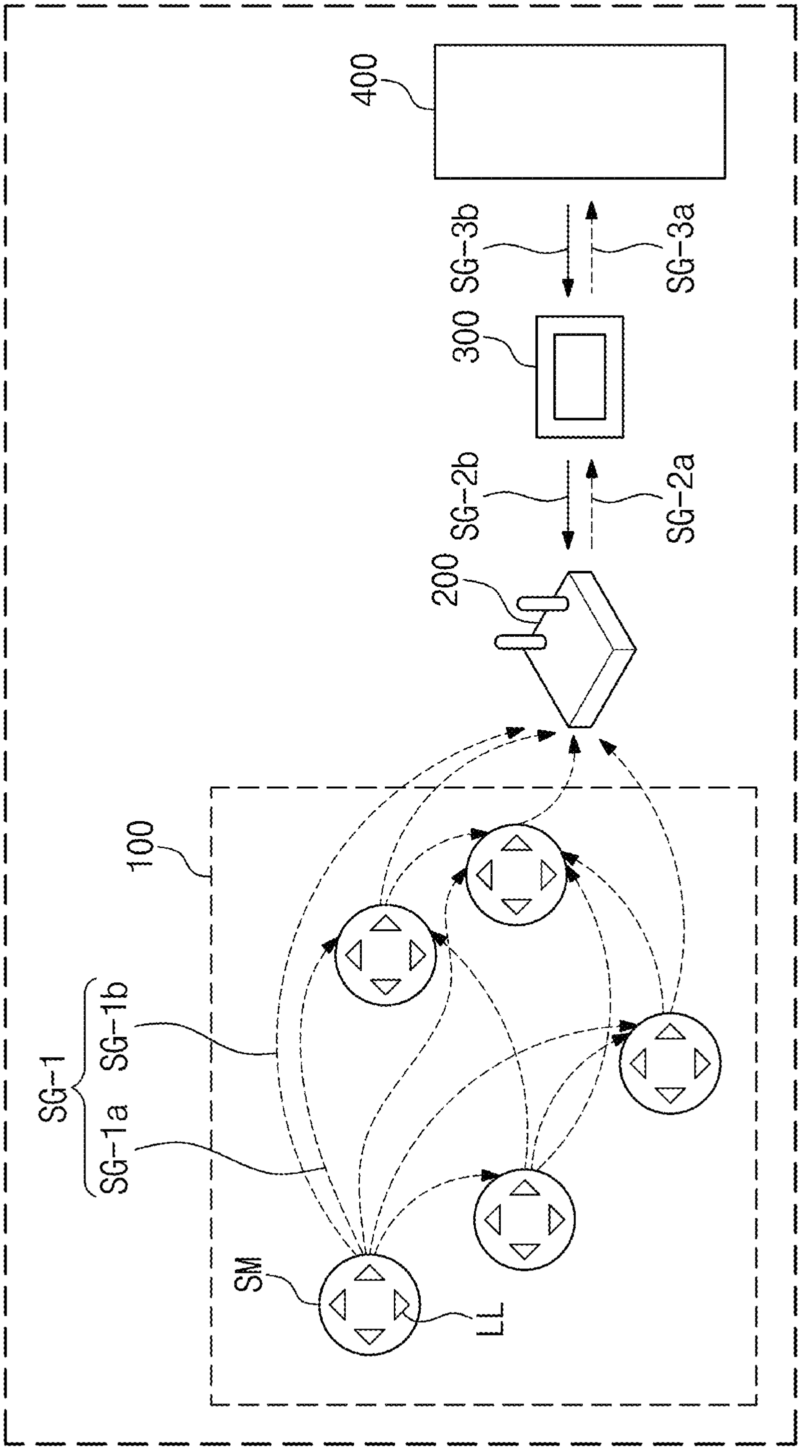
FIG. 1 shows a shortest evacuation route system according to an embodiment of the present disclosure.

In this document, when any component (or region, layer, part, etc.) is mentioned as being 'on,' 'connected to,' or 'coupled with' another component, it means that the component may be directly placed/connected/coupled on the other component, or that a third component may be placed between them.

The same reference numerals refer to the same components. Additionally, in the drawings, the thickness, proportions, and dimensions of the components are exaggerated for effective description of the technical content. The term 'and/or' includes all combinations that may be defined by the associated components.

The terms 'first,' 'second,' etc., may be used to describe various components, but these components should not be limited by these terms. These terms are used only to distinguish one component from another. For example, without departing from the scope of the present disclosure, a first component may be named as the second component, and similarly, the second component may be named as the first component. Singular expressions include plural expressions unless the context clearly indicates otherwise.

Furthermore, the terms 'below,' 'lower,' 'above,' 'upper,' etc., are used to describe the relationships between components shown in the drawings. These terms are relative concepts and are described based on the direction shown in the drawings.

The terms 'comprise' or 'include' are meant to indicate that the features, numbers, steps, actions, components, parts, or combinations of them described in this document exist and should not be interpreted as excluding the presence or addition of other features, numbers, steps, actions, components, parts, or combinations of them.

Unless otherwise defined, all terms used in this document (including technical and scientific terms) have the same meaning as generally understood by those skilled in the art to which the present disclosure pertains. Additionally, terms defined in commonly used dictionaries should be interpreted in a way that aligns with their meaning in the context of the relevant technology, and unless explicitly defined here, they should not be interpreted in an overly idealistic or excessively formal manner.

Hereinafter, embodiments of the present disclosure will be described with reference to the drawings.

FIG. 1 shows a shortest evacuation route system according to an embodiment of the present disclosure.

Referring to FIG. 1, the shortest evacuation route system 10 may detect a fire situation and display an evacuation route to evacuees.

The shortest evacuation route system 10 may include a sensing system 100, a relay 200, a receiver 300, and a first server 400.

The sensing system 100 may be a system that detects whether a fire has occurred. The sensing system 100 may include a plurality of sensing units SM. In FIG. 1, the sensing system 100 is illustratively shown to include five sensing units SM, but is not limited thereto.

Each of the plurality of sensing units SM may detect an occurrence of the fire. Each of the plurality of sensing units SM may simultaneously detect heat, smoke, gas, and humidity. In other words, each of the plurality of sensing units SM may detect all of heat, smoke, gas, and humidity.

Each of the plurality of sensing units SM may generate a fire detection signal SG-1 when the detected value is measured to be equal to or above a threshold.

For example, each of the plurality of sensing units SM may measure smoke. The concentration of the smoke may be calculated as a percentage of a fire detection threshold, with a minimum value of 5% and a maximum value of 100%. When the percentage (the concentration of the smoke) reaches 100%, the plurality of sensing units SM may determine that the fire has occurred.

Each of the plurality of sensing units SM may measure temperature. Each of the plurality of sensing units SM may determine that the fire has occurred when the temperature is 64° C.

Each of the plurality of sensing units SM may measure carbon monoxide. Each of the plurality of sensing units SM may have a measurement range of 10 ppm to 1000 ppm. Each of the plurality of sensing units SM may determine that the fire has occurred if the concentration of the smoke (calculated as the percentage) is 100% and the carbon monoxide measurement is 20 ppm or higher.

Each of the plurality of sensing units SM may include a guide light LL. The guide light LL may be exposed outside the sensing unit SM and may indicate direction to an adjacent evacuee through light. The guide light LL may be arranged to indicate in four directions that intersect with each other. For example, the guide light LL may light up in east, west, south, and north positions to indicate the direction.

Each of the plurality of sensing units SM may include different unique address information. The address information may be included in the fire detection signal SG-1 and transmitted, enabling easy identification of the location of each sensing unit SM.

Each of the plurality of sensing units SM may transmit the fire detection signal SG-1 to adjacent sensing units SM and/or the relay 200. The fire detection signal SG-1 may include the unique address information. Through this, an object that receives the fire detection signal SG-1 may identify which sensing unit SM the fire detection signal SG-1 was transmitted from, based on the unique address information.

The fire detection signal SG-1 may include a first signal SG-1*a* and a second signal SG-1*b*. The first signal SG-1*a* may be a signal generated by the sensing unit SM that detects an occurrence of the fire. The second signal SG-1*b* may be a signal amplified by a fire detector MS.

A method for transmitting and receiving the fire detection signal SG-1 may include an RF (Radio Frequency) communication method. The RF communication method may be a communication method that exchanges information by emitting a radio frequency. As a broadband communication method using frequency, it may be less affected by climate and environmental factors, providing high stability. The RF communication method may integrate voice or other additional functions and may have a fast transmission speed. For example, the RF communication method may use frequencies in 447 MHz to 924 MHz range. However, this is illustrative, and in one embodiment of the present disclosure, communication methods such as Ethernet, Wifi, LoRA, M2M, 3G, 4G, LTE, LTE-M, Bluetooth, or WiFi Direct may be used.

In one embodiment of the present disclosure, the RF communication method may include an LBT (Listen Before Transmission) communication method. This method is a frequency selection method that determines whether the selected frequency is being used by another system, and if it is occupied, it selects a different frequency. For example, a node intending to transmit first listens to the medium to determine if it is idle, and then may transmit a backoff protocol before transmitting data. By using this LBT communication method, data may be processed in a distributed manner, preventing signal collisions within the same frequency band.

The relay 200 may communicate with the plurality of sensing units SM via RF communication. For example, the relay 200 may communicate with 40 sensing units SM. The relay 200 may receive the fire detection signal SG-1 from the plurality of sensing units SM. The relay 200 may convert the fire detection signal SG-1 into a first transmission signal SG-2*a*. In other words, the first transmission signal SG-2*a* may include the fire detection signal SG-1. The relay 200 may transmit the first transmission signal SG-2*a* to the receiver 300. The relay 200 may receive a first reception signal SG-2*b* from the receiver 300.

The method for transmitting and receiving the first transmission signal SG-2*a* and the first reception signal SG-2*b* may include the RF communication method. In other words, the relay 200 and receiver 300 may communicate via RF.

The receiver 300 may receive the first transmission signal SG-2*a* from the relay 200. When the receiver 300 receives the first transmission signal SG-2*a*, the receiver 300 may transmit the first reception signal SG-2*b* to the relay 200.

The receiver 300 may convert the first transmission signal SG-2*a* into a second transmission signal SG-3*a*. The second transmission signal SG-3*a* may include the fire detection signal SG-1. The receiver 300 may transmit the second transmission signal SG-3*a* to the first server 400. The receiver 300 may receive a second reception signal SG-3*b* from the first server 400.

The method for transmitting the second transmission signal SG-3*a* and the second reception signal SG-3*b* may include the RF communication method. In other words, the receiver 300 and first server 400 may communicate via RF.

The first server 400 may receive the second transmission signal SG-3*a* from the receiver 300. When the first server 400 receives the second transmission signal SG-3*a*, the first server 400 may transmit the second reception signal SG-3*b* to the receiver 300.

The first transmission signal SG-2*a* and the second transmission signal SG-3*a* may be essentially same as the fire detection signal SG-1.

The first server 400 may determine a fire situation based on the fire detection signal SG-1 received from the receiver 300. The first server 400 may also be referred to as the shortest evacuation route generation server 400. The shortest evacuation route generation server 400 may output the shortest evacuation route based on the fire detection signal SG-1.

Figure 2:
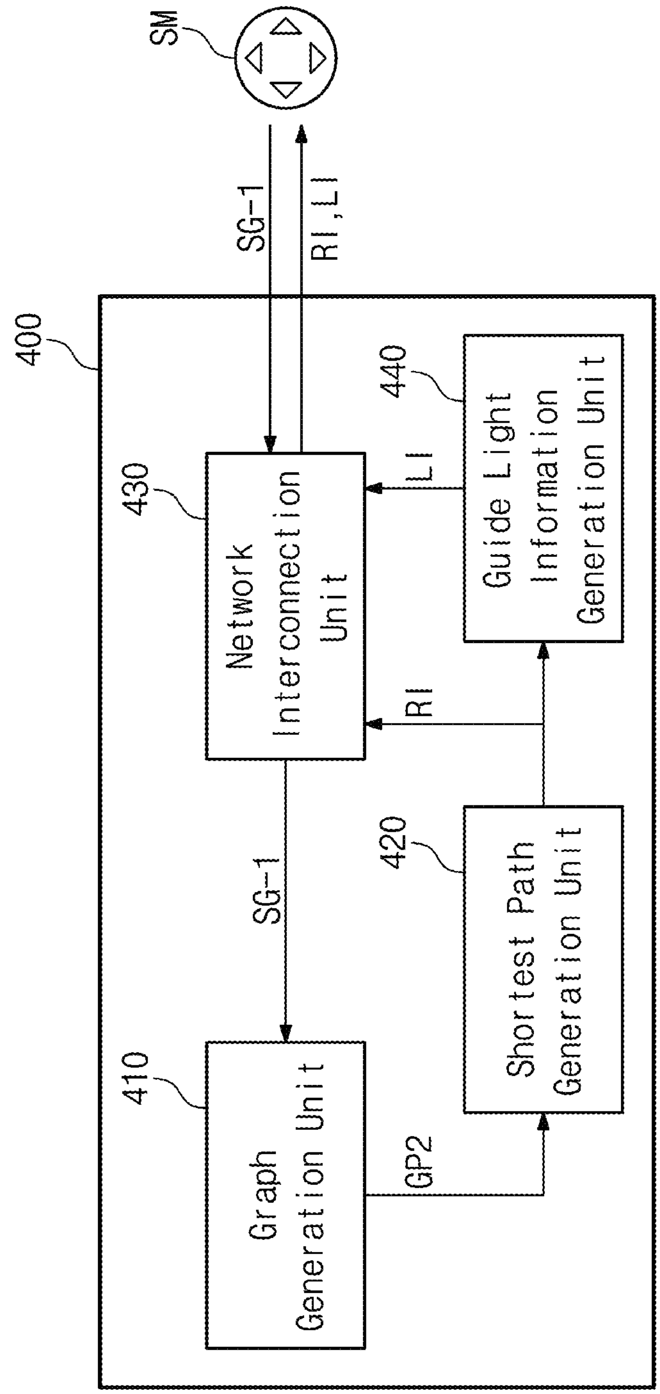
FIG. 2 shows a shortest evacuation route generation server according to an embodiment of the present disclosure.
Figure 3:
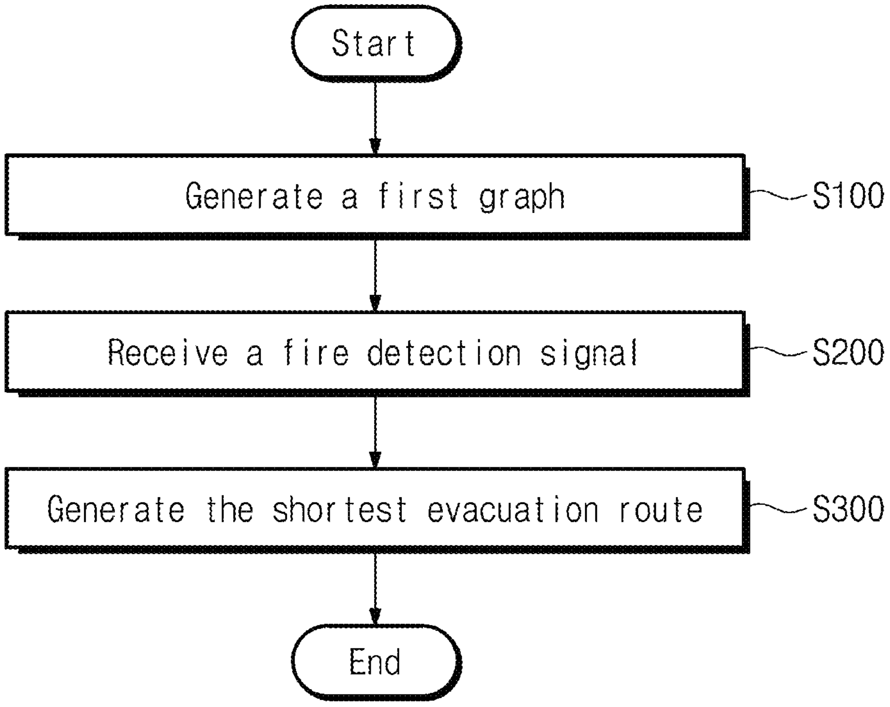
FIG. 3 is a flowchart illustrating a shortest evacuation route operation method according to an embodiment of the present disclosure.

FIG. 2 shows a shortest evacuation route generation server according to an embodiment of the present disclosure. FIG. 3 is a flowchart illustrating a shortest evacuation route operation method according to an embodiment of the present disclosure.

Referring to FIG. 2 and FIG. 3, the shortest evacuation route generation server 400 may include a graph generation unit 410, a shortest path generation unit 420, a network interconnection unit 430, and a guide light information generation unit 440.

The network interconnection unit 430 may communicate with outside. The network interconnection unit 430 may receive the fire detection signal SG-1 from the plurality of sensing units SM. The network interconnection unit 430 may transmit the shortest evacuation route information RI and guide light information LI to the plurality of sensing units SM.

The graph generation unit 410 may define positions of the plurality of sensing units SM as a plurality of vertices and generate a first graph having the plurality of vertices and edges connecting the plurality of vertices (S100). The positions of the plurality of sensing units SM may be defined based on the address information of each sensing unit SM.

The first graph may be generated based on graph theory. The first graph may be defined as an ordered pair of a set of vertices V and a set of edges E. In other words, the first graph may satisfy the following mathematical expression, Equation 1.

$$G=(V,E) \qquad \text{[Equation 1]}$$

The shortest evacuation route generation server 400 may store, in the form of a first graph, layout information of the plurality of sensing units SM linked by building layout.

The graph generation unit 410 may receive a fire detection signal SG-1 from the network interconnection unit 430 (S200).

Based on the fire detection signal SG-1, the graph generation unit 410 may identify a location where a fire has occurred and update the first graph by deleting an edge leading to a vertex corresponding to the fire occurrence location, thus generating a second graph GP2. It will be described later.

The fire occurrence location may be a location corresponding to a sensing unit, among the plurality of sensing units SM, that generates the fire detection signal SG-1.

The shortest path generation unit 420 may generate shortest evacuation route information RI between a start vertex and a destination vertex from among a plurality of vertices in the second graph GP2 (S300). The start vertex may be a vertex corresponding to a sensing unit, among the plurality of sensing units SM, that receives the shortest evacuation route information RI. In other words, the start vertex may be defined for each sensing unit among the plurality of sensing units SM. The start vertex is a starting point of the shortest evacuation route information RI. The destination vertex may be a vertex corresponding to a sensing unit, among the plurality of sensing units SM, that is adjacent to an area where an emergency exit is located. In other words, the destination vertex is an endpoint of the shortest evacuation route information RI.

The shortest path generation unit 420 may transmit the shortest evacuation route information RI to the network interconnection unit 430.

The guide light information generation unit 440 may receive the shortest evacuation route information RI from the shortest path generation unit 420. The guide light information generation unit 440 may generate guide light information LI to control lighting of the guide light LL (as shown in FIG. 1) based on the shortest evacuation route information RI.

The guide light information generation unit 440 may provide the guide light information LI to the network interconnection unit 430. The network interconnection unit 430 may transmit the guide light information LI to the plurality of sensing units SM.

Each of the plurality of sensing units SM may light up the guide light LL in a direction corresponding to the shortest evacuation route information RI based on the guide light information LI.

According to the present disclosure, the shortest evacuation route generation server 400 may analyze the relationship between the connection status of a vertex representing a current location and a vertex where a fire occurred, then generate the shortest evacuation route information RI and transmit the shortest evacuation route information to the plurality of sensing units SM. The plurality of sensing units SM may light up the guide light LL to avoid the area where the fire occurred, based on the received shortest evacuation route information RI and guide light information LI, allowing evacuees to safely evacuate. Therefore, a more reliable shortest evacuation route system 10 (as shown in FIG. 1) and shortest evacuation route operation method may be provided.

Figure 4:
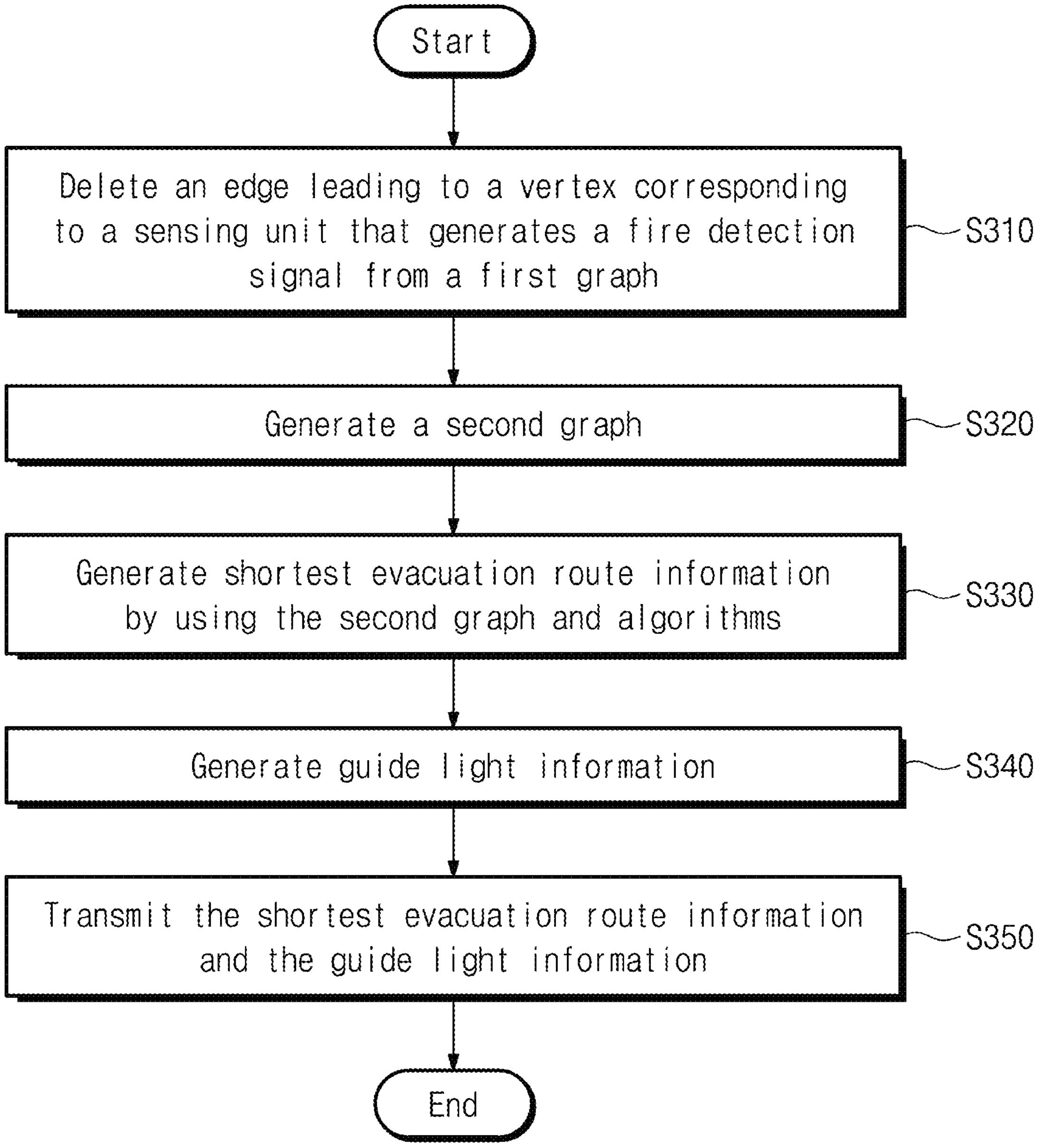
FIG. 4 is a flowchart illustrating a step of generating the shortest evacuation route according to an embodiment of the present disclosure.
Figure 5:
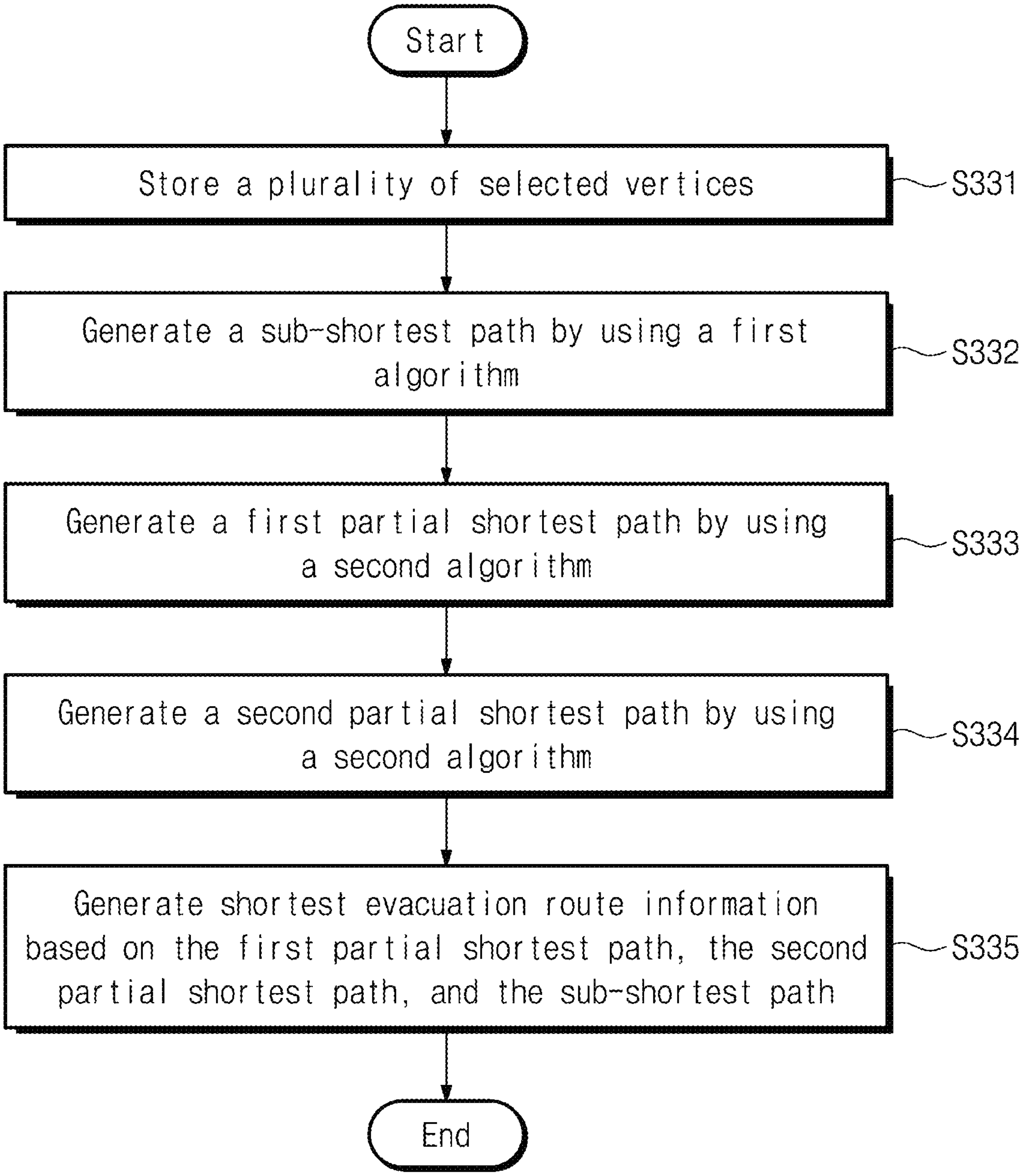
FIG. 5 is a flowchart illustrating a step of generating shortest evacuation route information according to an embodiment of the present disclosure.

FIG. 4 is a flowchart illustrating a step of generating the shortest evacuation route according to an embodiment of the present disclosure. FIG. 5 is a flowchart illustrating a step of generating shortest evacuation route information according to an embodiment of the present disclosure.

Referring to FIGS. 2, 4, and 5, the graph generation unit may delete an edge leading to a vertex corresponding to a sensing unit, among the plurality of sensing units SM, that generates a fire detection signal SG-1 from a first graph (S310).

The vertex corresponding to the sensing unit, that generates the fire detection signal SG-1, may be a point where a detection concentration of the sensing unit exceeds a threshold value, and that vertex may be considered as the area where the fire has occurred.

In this case, the graph generation unit 410 may delete only the edge, not the vertex, corresponding to the sensing unit that generates the fire detection signal SG-1. Based on this, a path may be defined so that evacuees located in the fire-affected area may escape through other edges connected to the vertex corresponding to the sensing unit that generated the fire detection signal SG-1, without passing through the area where the fire occurred.

The graph generation unit 410 may generate a second graph GP2 (S320). The graph generation unit 410 may transmit the second graph GP2 to the shortest path generation unit 420 (S330).

The shortest path generation unit 420 may generate the shortest evacuation route information RI by using the second graph GP2 and algorithms (S330).

The shortest path generation unit 420 may store a plurality of selected vertices among the plurality of vertices of the second graph GP2, where a number of connected edges is equal to or greater than the average (S331). The plurality of selected vertices may be stored in a list format.

The plurality of selected vertices may include a sub-start vertex and a sub-destination vertex.

The sub-start vertex may be a vertex corresponding to a sensing unit that receives the shortest evacuation route information RI or a vertex of another sensing unit adjacent to that sensing unit.

The sub-destination vertex may be a vertex corresponding to a sensing unit that is adjacent to an area where an emergency exit is located, or a vertex of another sensing unit adjacent to that sensing unit.

The shortest path generation unit 420 may generate the sub-shortest path between the sub-start vertex and the sub-destination vertex using the first algorithm (S332). The first algorithm may be Dijkstra algorithm.

TABLE 1

```
function Dijkstra(Graph, source):
create vertex set Q
for each vertex v in Graph: // initilization
dist[v] ← INFINITY
prev[v] ← UNDEFINED
add v to Q
dist[source] ← 0
whileQ is not empty:
u ← vertex in Q with min dist[u] // Vertex
with the minimum distance
remove u from Q
for each neighbor v of u: // v is still in Q.
alt ← dist[u] + length(u, v)
ifalt < dist[v] : // If a shorter path to v is found
dist[v] ← alt
prev[v] ← u
return dist[ ], prev[ ]
```

Table 1 shows a pseudocode of the Dijkstra Algorithm. Referring to Table 1, the Dijkstra algorithm may mark all of the multiple selected vertices as unvisited and generate a set of all selected vertices called an unvisited set.

Then, the Dijkstra algorithm may initialize by assigning tentative distance values to the selected vertices.

The Dijkstra algorithm may search for each unvisited adjacent selected vertices from the currently selected vertex and calculate the tentative distance.

Once the tentative distances for all unvisited adjacent selected vertices are calculated, the currently selected vertex may be marked as visited and removed from the unvisited set.

If a path is found between two selected vertices among the plurality of selected vertices, the Dijkstra algorithm may terminate when the sub-destination point is marked as visited.

Otherwise, if the minimum tentative distance among the selected vertices in the unvisited set is infinity, it may indicate that there is no connection between the sub-start vertex and the unvisited set, and the algorithm may terminate.

Otherwise, the next unvisited node with the smallest tentative distance is chosen as the new current selected vertex, and the tentative distance may be recalculated.

Through these steps of the Dijkstra algorithm, the sub-shortest path may be calculated.

The shortest path generation unit 420 may store the result of the sub-shortest path in a table format.

If the start vertex matches the sub-start vertex and the destination vertex matches the sub-destination vertex, the shortest path generation unit 420 may generate the shortest evacuation route information RI based on the sub-shortest path.

If the start vertex does not match the sub-start vertex, the shortest path generation unit 420 may generate a first partial shortest path between the start vertex and the sub-start vertex by using the second algorithm (S333). The second algorithm may be different from the first algorithm. The second algorithm may be the A* algorithm.

TABLE 2

```
function A-Star(start_node):
PQ.push(start_node, g(start_node) + h(start_node))
while PQ is not empty
node = PQ. pop
if node == goal_node
break
for next_node in (next_node_begin . . . next_node_end)
PQ.push(next_node, g(node) + cost + h(next_node) )
print goal_node_dist
```

The A* algorithm is a method for searching a point where $f(x)=g(x)+h(x)$ is minimized, where $g(x)$ is a cost of current state and $h(x)$ is a heuristic function for moving from the current state to next state.

$f(x)$ may be inserted into an ascending priority queue as a node.

The priority queue may be popped, and the highest-priority data may be output.

The A* algorithm may find nodes that may be moved to from the current node.

The A* algorithm may calculate the $f(x)$ of those nodes.

The nodes may be inserted into the priority queue.

This process by the A* algorithm may repeat until the goal node, the sub-start vertex, is reached.

Through these steps of the A* algorithm, the first partial shortest path may be calculated.

If the destination vertex does not match the sub-destination vertex, the shortest path generation unit 420 may generate a second partial shortest path between the destination vertex and the sub-destination vertex by using the second algorithm.

Through the steps of the A* algorithm, the second partial shortest path may be calculated.

The shortest path generation unit 420 may generate the shortest evacuation route information RI based on the first partial shortest path, the second partial shortest path, and the sub-shortest path.

According to an embodiment of the present disclosure, the shortest evacuation route operation method may calculate a plurality of paths from the start vertex to the destination vertex by using a plurality of sub-paths from the sub-start vertex to the sub-destination vertex, a plurality of first partial paths from the start vertex to the sub-start vertex, and a plurality of second partial paths from the sub-destination vertex to the destination vertex. The shortest path generation unit 420 may calculate the shortest evacuation route information Ri based on the plurality of paths.

In this case, the shortest path generation unit 420 may calculate plurality of sub-paths by using the first algorithm, which is the Dijkstra algorithm, and may calculate the plurality of first partial paths and the plurality of second partial paths by using the second algorithm, which is the A* algorithm, different from the first algorithm.

There are various algorithms for calculating the shortest distance. For example, in addition to the aforementioned Dijkstra algorithm and A* algorithm, the Bellman-Ford algorithm and the Floyd-Warshall algorithm may also be included.

The shortest evacuation route operation method according to an embodiment of the present disclosure is for scenarios where evacuees quickly escape toward an emergency exit during a fire situation. Since the environment does not involve negative weights, the method does not use the Bellman-Ford algorithm and the Floyd-Warshall algorithm, which are typically used for calculating the shortest distance in environments with negative weights.

Additionally, unlike the present disclosure, when using only the Dijkstra algorithm, it may take a long time to compute as the Dijkstra algorithm searches all paths in the search space. Similarly, when using only the A* algorithm, if the search range along the path is wide, it may not provide the shortest path, which could also result in long computation times. As a result, it may be difficult to quickly present evacuation routes to evacuees during a fire situation. However, according to the present disclosure, the shortest path generation unit 420 may perform partial path exploration by using the first algorithm, and detailed path exploration may be performed by using the second algorithm. In other words, the shortest path generation unit 420 may combine the first and second algorithms to generate the shortest evacuation route information RI.

The guide light information generation unit 440 may generate guide light information LI based on the shortest evacuation route information RI.

The network interconnection unit 430 may transmit the received shortest evacuation route information RI and guide light information LI to each corresponding sensing unit SM.

Figure 6:
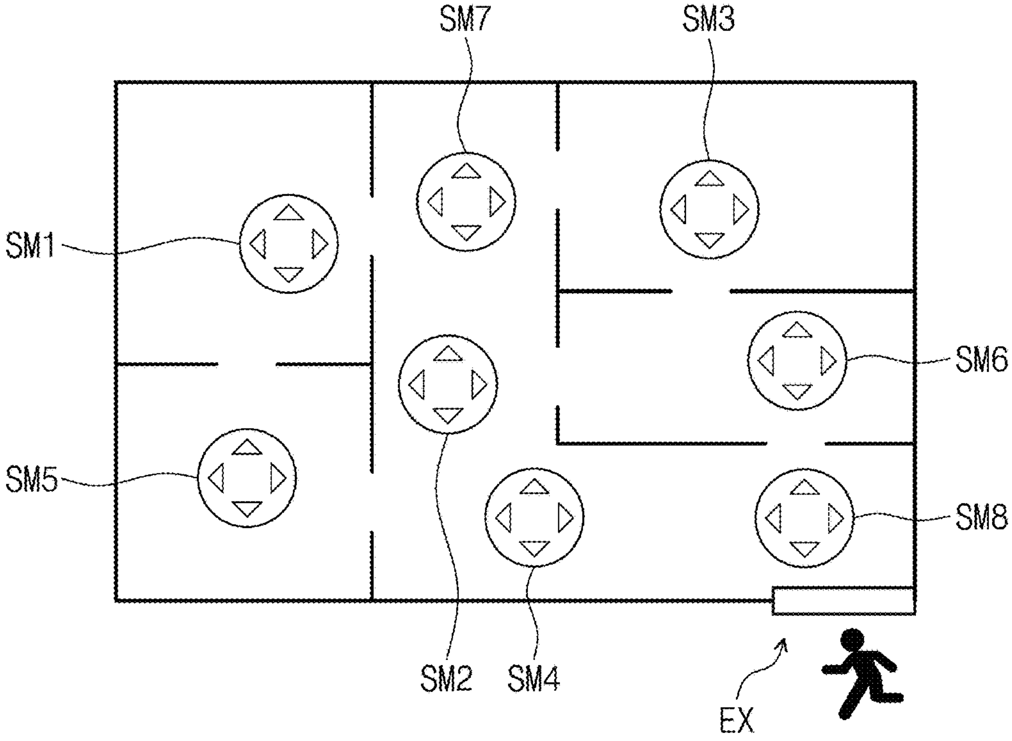
FIG. 6 is a drawing for describing the shortest evacuation route operation method before an occurrence of a fire according to an embodiment of the present disclosure.
Figure 7:
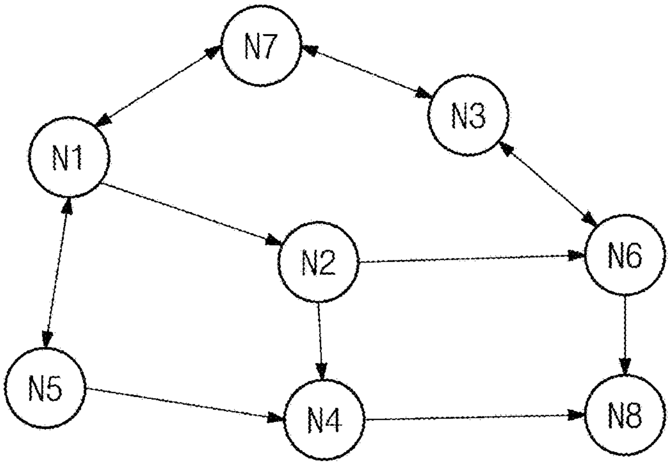
FIG. 7 shows a first graph according to an embodiment of the present disclosure.

FIG. 6 is a drawing for describing the shortest evacuation route operation method before an occurrence of a fire according to an embodiment of the present disclosure. FIG. 7 shows a first graph according to an embodiment of the present disclosure.

Referring to FIGS. 1, 2, 6, and 7, the shortest evacuation route system 10 may be installed and used within a building. However, this is illustrative, and the shortest evacuation route system 10 according to one embodiment of the present disclosure may be installed and used in various locations where a fire may occur. For example, the shortest evacuation route system 10 may be installed and used in a warehouse.

The plurality of sensing units SM may include the first to eighth sensing units SM1, SM2, SM3, SM4, SM5, SM6, SM7, SM8.

The first to eighth sensing units SM1, SM2, SM3, SM4, SM5, SM6, SM7, SM8 may be placed in rooms and corridors of the building. The first to eighth sensing units SM1, SM2, SM3, SM4, SM5, SM6, SM7, SM8 may be positioned at regular intervals to respond based on the situation in case of a fire. The eighth sensing unit SM8 may be adjacent to an area where an emergency exit EX is located.

The graph generation unit 410 may define locations of the plurality of sensing units SM as a plurality of vertices.

A first vertex N1 may correspond to a first sensing unit SM1. A second vertex N2 may correspond to a second sensing unit SM2. A third vertex N3 may correspond to a third sensing unit SM3. A fourth vertex N4 may correspond to a fourth sensing unit SM4. A fifth vertex N5 may correspond to a fifth sensing unit SM5. A sixth vertex N6 may correspond to a sixth sensing unit SM6. A seventh vertex N7 may correspond to a seventh sensing unit SM7. A eighth vertex N8 may correspond to a eighth sensing unit SM8.

The graph generation unit 410 may generate the first graph.

The first graph is having vertices and edges that connect the vertices. Generally, vertices are represented by circles, and edges are represented by arrows or line segments. When edges are represented by arrows, movement may only occur in the direction of the arrow, and such a graph is called a directed graph. In contrast, when edges are represented by line segments, movement is possible in both directions, and such a graph is called an undirected graph. Additionally, edges may have specific numerical values, which are called weights.

Figure 8:
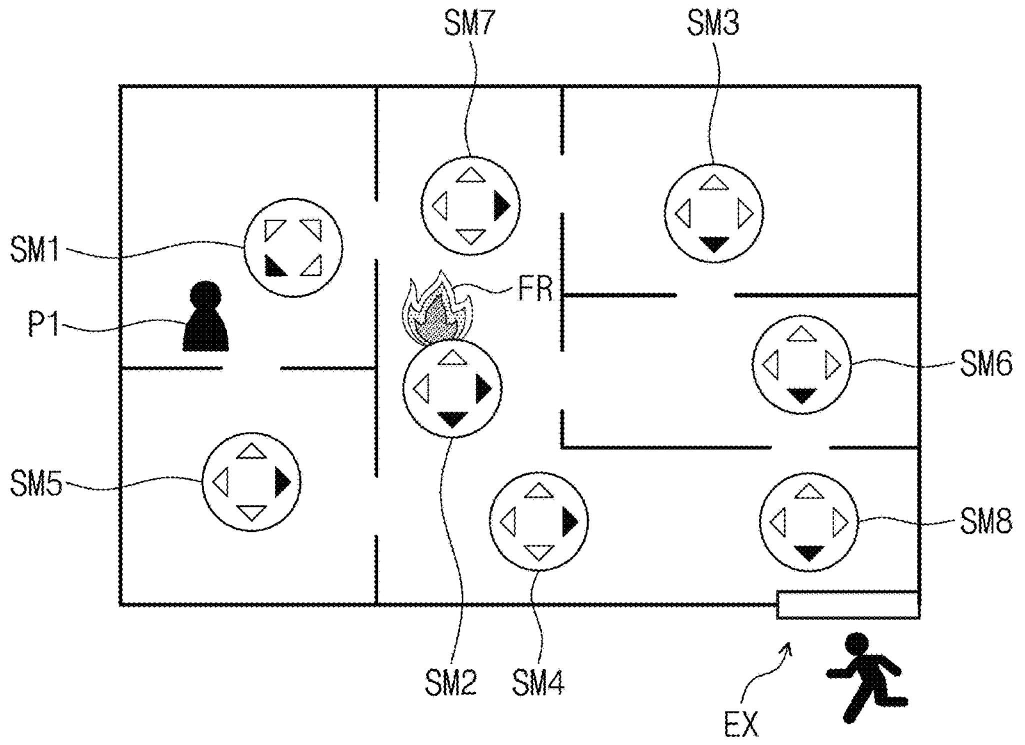
FIG. 8 is a drawing for describing the shortest evacuation route operation method after an occurrence of a fire according to an embodiment of the present disclosure.
Figure 9:
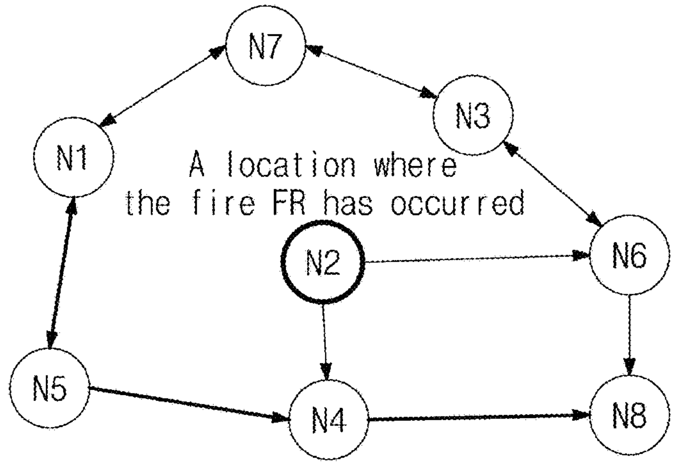
FIG. 9 shows a second graph according to an embodiment of the present disclosure.

FIG. 8 is a drawing for describing the shortest evacuation route operation method after an occurrence of a fire according to an embodiment of the present disclosure. FIG. 9 shows a second graph according to an embodiment of the present disclosure. With reference to explaining FIGS. 8 and 9, the components described in FIGS. 6 and 7 are denoted by the same reference numerals, and their descriptions are omitted.

Referring to FIGS. 1, 2, 8, and 9, if a fire FR occurs in an area adjacent to an area where the second sensing unit SM2 is located, a person P1 may evacuate by following the guide light LL (as shown in FIG. 1) displayed on each of the first to eighth sensing units SM1, SM2, SM3, SM4, SM5, SM6, SM7, SM8.

The graph generation unit 410 may delete an edge leading to the second vertex N2, corresponding to a location where the fire FR has occurred, based on the fire detection signal SG-1. The graph generation unit 410 may update the first graph to generate the second graph GP2.

The shortest path generation unit 420 may generate the shortest evacuation route information RI between the start vertex and the destination vertex among the plurality of vertices, based on the second graph GP2.

According to the present disclosure, if the fire FR occurs, the shortest evacuation route generation server 400 may define the second graph GP2 by deleting an edge leading to the second vertex N2, which corresponds to an area where the fire FR occurred, so that the evacuee will not move to that area. As a result, the shortest path generation unit 420 may generate the shortest evacuation route information RI that avoids the second vertex N2 and provide it to each of the sensing units SM. In this case, instead of deleting the second vertex N2, an edge leading to the second vertex N2 is deleted. The evacuation route, which is generated based on shortest evacuation route information RI, with the second vertex N2 as the start vertex and the emergency exit EX as the destination vertex, and guide light information LI, received by the second sensing unit SM2, may be provided to the evacuees through the guide light LL. Therefore, a more reliable shortest evacuation route system 10 (as shown in FIG. 1) and shortest evacuation route operation method may be provided.

The shortest path generation unit 420 may calculate the shortest path by using the shortest path operation method based on the second graph GP2.

The shortest path generation unit 420 may store a plurality of selected vertices. For example, the plurality of selected vertices may include the fourth vertex N4 and the sixth vertex N6.

The shortest path generation unit 420 may generate a sub-shortest path by using the first algorithm. Since the fourth vertex N4 and the sixth vertex N6 are not connected, the minimum tentative distance among the selected vertices is infinite, and the first algorithm may terminate. In this case, the sub-start vertex and the sub-destination vertex may each be the fourth vertex N4 or the sixth vertex N6.

Since the first vertex N1, the start vertex, does not match the sub-start vertex, the shortest path generation unit 420 may generate the first partial shortest path between the first vertex N1, and the fourth vertex N4 or the sixth vertex N6 by using the second algorithm.

Since the shortest path between the first vertex N1 and the fourth vertex N4 is shorter than the shortest path between the first vertex N1 and the sixth vertex N6, the first partial shortest path may be selected to pass through the first vertex N1, the fifth vertex N5, and the fourth vertex N4.

Since the destination vertex, the eighth vertex N8, does not match the sub-destination vertex, the shortest path generation unit 420 may generate the second partial shortest path between the fourth vertex N4 and the eighth vertex N8 by using the second algorithm. The shortest path generation unit 420 may calculate the shortest path passing through the first vertex N1, the fifth vertex N5, the fourth vertex N4, and the eighth vertex N8 based on the first and second partial shortest paths.

According to the present disclosure, the shortest path generation unit 420 may perform partial path search by using the first algorithm and detailed path search by using the second algorithm. In other words, the shortest path generation unit 420 may combine the first and second algorithms to generate the shortest evacuation route information RI. The shortest path generation unit 420 may improve the shortcomings of each algorithm and utilize the advantageous parts. Therefore, a more reliable shortest evacuation route system 10 (as shown in FIG. 1) and its operation method may be provided.

For example, a person P1 may evacuate by following the guide light LL displayed by the first sensing unit SM1 in an area where the first sensing unit SM1 is located. The first sensing unit SM1 may receive the shortest evacuation route information RI and guide light information LI from the network interconnection unit 430. The shortest evacuation route information RI received by the first sensing unit SM1 may include an evacuation route passing through the fifth vertex N5 and the fourth vertex N4 from the first vertex N1, which is the start vertex, to the eighth vertex N8, which is the destination vertex. Based on the guide light information LI, the first sensing unit SM1 may light the guide light LL towards the fifth sensing unit SM5, which corresponds to the fifth vertex N5.

Although the preferred embodiment of the present disclosure has been described with reference to the drawings, those skilled in the art or those with ordinary knowledge in the relevant field will understand that the present disclosure may be variously modified and changed within the scope of the claims without departing from the spirit and technical scope of the present disclosure. Therefore, the technical scope of the present disclosure should not be limited to the detailed description in the specification, but should be determined by the claims.

As described above, the shortest path generation unit is configured to perform partial path searching using the first algorithm, and detailed path searching may be performed using the second algorithm. In other words, the shortest path generation unit may generate the shortest evacuation route information by combining the first and second algorithms. The shortest path generation unit improves the disadvantages of each algorithm and utilizes the advantages of each. Therefore, a more reliable shortest evacuation route system and its operation method may be provided.

What is claimed is:

1. A shortest evacuation route system comprising:

a plurality of sensing units, each including an evacuation guide light, configured to output and transmit a fire detection signal which is a signal generated by detecting an occurrence of a fire or an amplified signal of a received signal; and a shortest evacuation route generation server, wherein the shortest evacuation route generation server comprises:

a graph generation unit configured to define positions of a plurality of sensing units as a plurality of vertices and generate a first graph having the plurality of vertices and edges connecting the plurality of vertices;

a shortest path generation unit configured to generate shortest evacuation route information between a start vertex and a destination vertex among the plurality of vertices; and a network interconnection unit configured to receive the fire detection signal and transmit the shortest evacuation route information to the plurality of sensing units, wherein the graph generation unit generates a second graph by deleting an edge leading to a vertex corresponding to a sensing unit that generates the fire detection signal from the first graph, among the plurality of sensing units, and wherein the shortest path generation unit generates the shortest evacuation route information based on the second graph.

2. The shortest evacuation route system of claim 1, wherein the shortest path generation unit stores a plurality of selected vertices where a number of connected edges is above average, among the plurality of vertices in the second graph, wherein the plurality of selected vertices include a sub-start vertex and a sub-destination vertex, and wherein the shortest path generation unit generates a sub-shortest path between the sub-start vertex and the sub-destination vertex using a first algorithm.

3. The shortest evacuation route system of claim 2, wherein, when the start vertex matches the sub-start vertex and the destination vertex matches the sub-destination vertex, the shortest path generation unit generates the shortest evacuation route information based on the sub-shortest path.

4. The shortest evacuation route system of claim 2, wherein, when the start vertex does not match the sub-start vertex, the shortest path generation unit is configured to:

generate a first partial shortest path between the start vertex and the sub-start vertex using a second algorithm different from the first algorithm, and generate the shortest evacuation route information based on the first partial shortest path and the sub-shortest path.

5. The shortest evacuation route system of claim 4, wherein the first algorithm is Dijkstra algorithm, and wherein the second algorithm is A* algorithm.

6. The shortest evacuation route system of claim 4, wherein, when the destination vertex does not match the sub-destination vertex, the shortest path generation unit is configured to:

generate a second partial shortest path between the destination vertex and the sub-destination vertex using the second algorithm, and generate the shortest evacuation route information based on the second partial shortest path and the sub-shortest path.

7. The shortest evacuation route system of claim 2, wherein the start vertex corresponds to a vertex of a sensing unit that receives the shortest evacuation route information, among the plurality of sensing units, and wherein the destination vertex corresponds to a vertex of a sensing unit that is adjacent to an area where an emergency exit is located, among the plurality of sensing units.

8. The shortest evacuation route system of claim 1, wherein the shortest evacuation route generation server further includes a guide light information generation unit configured to generate guide light information for controlling lighting of the evacuation guide light based on the shortest evacuation route information, and wherein the network interconnection unit transmits the guide light information to the plurality of sensing units.

9. The shortest evacuation route system of claim 8, wherein each of the plurality of sensing units light the evacuation guide light in a direction corresponding to the shortest evacuation route information based on the guide light information.

10. The shortest evacuation route system of claim 1, wherein each of the plurality of sensing units generate the fire detection signal when a detected value is measured to be equal to or above a threshold.

11. A method for generating the shortest evacuation route, the method comprising:

defining positions of a plurality of sensing units as a plurality of vertices and generating a first graph having the plurality of vertices and edges connecting the plurality of vertices;

receiving a fire detection signal from the plurality of sensing units; and generating shortest evacuation route information between a start vertex and a destination vertex among the plurality of vertices, wherein generating the shortest path information includes:

generating a second graph by deleting an edge leading to a vertex corresponding to a sensing unit that generates the fire detection signal from the first graph, among the plurality of sensing units;

storing a plurality of selected vertices where a number of connected edges is above average, among the plurality of vertices in the second graph, wherein the plurality of selected vertices include a sub-start vertex and a sub-destination vertex; and generating a sub-shortest path between the sub-start vertex and the sub-destination vertex using Dijkstra algorithm.

12. The method of claim 11, wherein, when the start vertex matches the sub-start vertex and the destination vertex matches the sub-destination vertex, generating the shortest evacuation route information further includes generating the shortest evacuation route information based on the sub-shortest path.

13. The method of claim 11, wherein, when the start vertex does not match the sub-start vertex, generating the shortest evacuation route information further includes generating a first partial shortest path between the start vertex and the sub-start vertex using A* algorithm, and generating the shortest evacuation route information based on the first partial shortest path and the sub-shortest path.

14. The method of claim 11, wherein, when the destination vertex does not match the sub-destination vertex, generating the shortest evacuation route information further includes generating a second partial shortest path between the destination vertex and the sub-destination vertex using A* algorithm, and generating the shortest evacuation route information based on the second partial shortest path and the sub-shortest path.

15. The method of claim 11, wherein the start vertex corresponds to a vertex of a sensing unit that receives the shortest evacuation route information, among the plurality of sensing units, and wherein the destination vertex corresponds to a vertex of a sensing unit that is adjacent to an area where an emergency exit is located, among the plurality of sensing units.

* * * * *